United States Patent
Kim et al.

(10) Patent No.: US 8,886,405 B2
(45) Date of Patent: Nov. 11, 2014

(54) APPARATUS FOR SUPPLYING POWER TO TRANSMITTER OF FUEL CELL VEHICLE

(75) Inventors: Hyung Ki Kim, Seoul (KR); Sang Hyun Kim, Gyeonggi-do (KR); Jihyun Shim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 255 days.

(21) Appl. No.: 13/189,955

(22) Filed: Jul. 25, 2011

(65) Prior Publication Data

US 2012/0150373 A1 Jun. 14, 2012

(30) Foreign Application Priority Data

Dec. 9, 2010 (KR) .................. 10-2010-0125690

(51) Int. Cl.
*B60G 17/0185* (2006.01)
*B60W 20/00* (2006.01)
*B60K 37/06* (2006.01)
*H01M 16/00* (2006.01)
*B60L 11/18* (2006.01)
*H01M 8/04* (2006.01)

(52) U.S. Cl.
CPC ........ *H01M 16/006* (2013.01); *H01M 8/04373* (2013.01); *H01M 8/04201* (2013.01); *H01M 2250/20* (2013.01); *H01M 8/04208* (2013.01); *H01M 8/04425* (2013.01); *Y02E 60/50* (2013.01); *Y02T 90/34* (2013.01); *Y02T 90/32* (2013.01); *B60L 11/1892* (2013.01)
USPC .................. 701/39; 701/22; 701/36

(58) Field of Classification Search
USPC ................................ 701/22, 36, 39
See application file for complete search history.

(56) References Cited

U.S. PATENT DOCUMENTS

| | | | |
|---|---|---|---|
| 2002/0162601 A1* | 11/2002 | Jin et al. | 141/94 |
| 2005/0092388 A1* | 5/2005 | Corless et al. | 141/97 |
| 2007/0283623 A1* | 12/2007 | Blencoe et al. | 48/61 |
| 2008/0202624 A1* | 8/2008 | Hajiaghajani | 141/1 |
| 2011/0259469 A1* | 10/2011 | Harty et al. | 141/4 |

FOREIGN PATENT DOCUMENTS

| | | |
|---|---|---|
| KR | 10-2008-0035825 A | 4/2008 |
| KR | 10-2009-0115585 A | 11/2009 |

* cited by examiner

*Primary Examiner* — Behrang Badii
*Assistant Examiner* — Daniel L Greene
(74) *Attorney, Agent, or Firm* — Edwards Wildman Palmer LLP; Peter F. Corless

(57) ABSTRACT

A power supply apparatus for a fuel cell vehicle, and provides a power supply apparatus of a fuel cell vehicle. More specifically, an InfraRed (IR) data transmitter transmits and receives data to/from a hydrogen charger and a power supply apparatus, that is connected to the IR data transmitter, selectively supplies power thereto according to the opening/closing of a fuel door. In particular, a sensing apparatus is connected to the power supply apparatus and senses opening/closing of the fuel door and a normal power source that is connected to the sensing apparatus for opening/closing the fuel door selectively supplies power to the sensing apparatus when the normal power source is off.

3 Claims, 2 Drawing Sheets

APPARATUS FOR SUPPLYING POWER TO TRANSMITTER OF FUEL CELL VEHICLE

CROSS-REFERENCE TO RELATED APPLICATION

This application claims priority to and the benefit of Korean Patent Application No. 10-2010-0125690 filed in the Korean Intellectual Property Office on Dec. 9, 2010, the entire contents of which are incorporated herein by reference.

BACKGROUND OF THE INVENTION (a) Field of the Invention

The present invention relates to an apparatus for supplying power to a transmitter of a fuel cell vehicle. More particularly, the present invention relates to an apparatus for supplying power to a transmitter of a fuel cell vehicle that includes a sensing apparatus for opening/closing a fuel door, a normal power source, and the power supply apparatus that selectively supplies power to an InfraRed (IR) data transmitter of a fuel cell vehicle.

(b) Description of the Related Art

Generally, a fuel cell is a nonpolluting power supply apparatus that generates electricity by producing a chemical reaction in a fuel, e.g., hydrogen and oxygen in the air and thus, provide a clean energy alternative which does not require the use of fossil fuels.

An electrical generator system using a fuel cell can be used as a generator in a large building or a power source for electric vehicles. In addition, the fuel cell can utilize a variety of fuels including natural gas and city gas as viable alternative to hydrogen.

Typically, however, a hydrogen charger is used to charge the fuel cell, and the charging is fulfilled by transmitting/receiving between a vehicle and the charger. That is, if the transmitter of the vehicle transmits data to the hydrogen charger, a required amount of fuel is charged by the hydrogen charger as a direct result. The hydrogen is charged into the fuel cell vehicle via data input into the hydrogen charger through a charging nozzle, which connects the fuel cell vehicle to the hydrogen charger.

Particularly, a normal communication charging method is used in a 70 Mpa hydrogen fuel cell vehicle in order to control the hydrogen charging speed for safety reasons. Communication methods include a wireless communication method and a wired communication method, but there is a tendency to use the wired communication method because of its desirable properties. However, there has recently been a tendency to use IR communication, which is enacted in SAE J2799, which is a wireless communication protocol.

When hydrogen is charged in the above method, it is always in a key-off state. Therefore, the required power is supplied to the transmitter of the vehicle by a normal power source, but there is a fear that the normal power source may be discharged. Because hydrogen is charged in a key-off state, the normal power source has to be supplied to transmit inner temperature data and pressure data of the hydrogen storage system to the hydrogen charger in real time. It takes 10 to 20 minutes for the hydrogen fuel cell vehicle to be charged, so the amount of power consumed is not much. However, the charging time can be lengthened because of a charging speed reduction via a temperature increase in the tank in summer and the capacity of a charger compressor.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a power supply apparatus for a fuel cell vehicle that automatically supplies power to an IR data transmitter according to opening/closing of the fuel door while charging/non-charging hydrogen into a fuel cell vehicle.

An exemplary embodiment of the present invention provides a power supply apparatus for a fuel cell vehicle. In particular, an IR data transmitter transmits/receives data to/from a hydrogen charger. A power supply apparatus, that is connected to the IR data transmitter, selectively supplies power thereto according to the opening/closing of a fuel door and a sensing apparatus, that is connected to the power supply apparatus, senses opening/closing of the fuel door. Also a normal power source, that is connected to the sensing apparatus for opening/closing the fuel door, selectively supplies power to the sensing apparatus.

Even more specifically, the normal power source according to an exemplary embodiment of the present invention supplies the sensing apparatus when it is sensed that the fuel door is opened and stops supplying power to the IR data transmitter when hydrogen charging to the fuel cell vehicle is finished and the fuel door is closed.

As described above, the power from the normal power source is supplied only when it is determined that the fuel door is opened/closed, and the power supply by the normal power source is stopped when the hydrogen charging is finished. This prevents a failed start due to battery discharge.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

An exemplary embodiment of the present invention relates to a power supply apparatus that supplies power to a transmitter 40 transmitting data associated with temperatures and pressures of the vehicle while charging, e.g., a 70 Mpa vehicle by using fuel cell.

Figure 1:
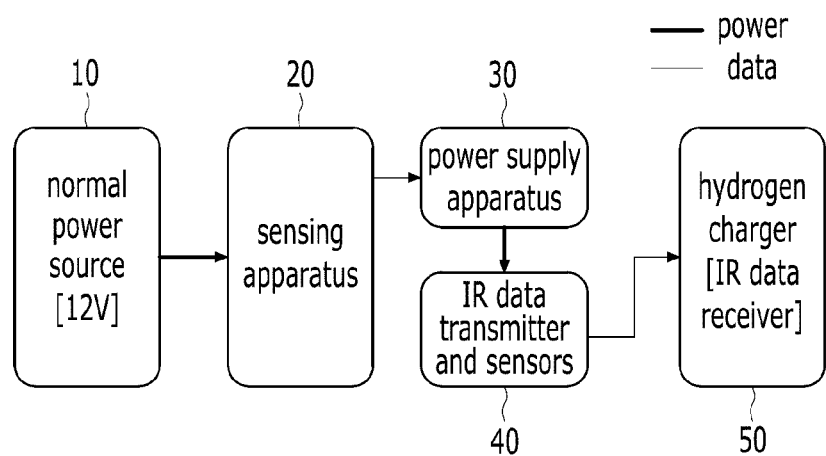
FIG. 1 is a schematic diagram of a power supply apparatus for the fuel cell vehicle according to an exemplary embodiment of the present invention.

FIG. 1 is a schematic diagram of an apparatus for supplying power to the transmitter 40 of the fuel cell according to an exemplary embodiment of the present invention, wherein as much hydrogen can be charged into a fuel cell vehicle as required by transmitting/receiving of an IR data transmitter and sensors 40, and an IR data receiver of a hydrogen charger 50. Hereinafter, the IR data transmitter and sensors are called the IR data transmitter 40.

When hydrogen is charged into the fuel cell vehicle, it is initiated while in a key-off state such that no power except that from a normal power source is supplied. However, the IR data transmitter 40, a pressure sensor that measures the inside pressure of the hydrogen storage apparatus, and a temperature sensor that measures the inside temperature must be able to transmit/receive data with the hydrogen charger 50 in spite of a key-off state. Therefore, power must always be supplied in order to transmit/receive data during hydrogen charging without allowing the battery to be completely discharged resulting is a ignition failure in the vehicle.

To achieve this, a power supply apparatus 30 supplying power to the transmitter of the fuel cell vehicle, as shown in FIG. 1, includes the IR data transmitter 40 that transmits/receives data to/from the hydrogen charger 50, and a power supply apparatus 30 that is connected to the IR data transmitter 40 and selectively supplies power to the IR data transmitter 40 according to hydrogen charging/non-charging. A sensing apparatus 20 is connected to the power supply apparatus 30 and senses the opening/closing of the fuel door, and the normal power source 10 that is connected to the sensing apparatus 20 and selectively supplies power accordingly.

If the sensing apparatus 20 senses that the fuel door is opened, the normal source 10 supplies power to the sensing apparatus 20, and if it is sensed that the fuel door is closed, the power supply to the sensing apparatus 20 is stopped/cut. In addition, if the hydrogen charging into the fuel cell vehicle is finished and the fuel door is closed, the power supply from the normal power source 10 into the IR data transmitter 40 is stopped as well.

Hereinafter, power supply flow to the transmitter 40 of the fuel cell vehicle according to an exemplary embodiment of the present invention will be described referring to FIG. 2.

Figure 2:
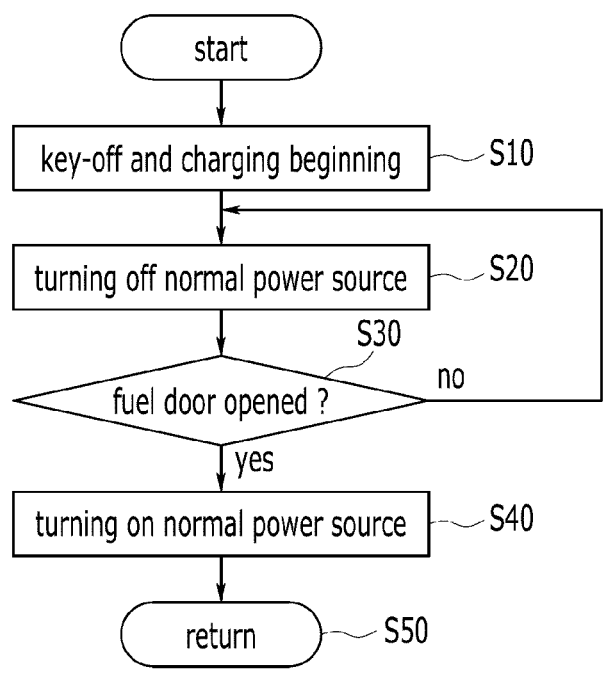
FIG. 2 a flowchart for power supply by a normal power source according to an exemplary embodiment of the present invention.

FIG. 2 shows power supply/cutoff for the transmitter 40 of the fuel cell vehicle according to charging/non-charging by a normal power source 10 according to an exemplary embodiment of the present invention. If the fuel cell vehicle is in a key-off state and hydrogen charging begins S10, the connection between the sensing apparatus 20 and the normal power source 10 is cut S20 by turning off the normal power source 10. At this time, power is not supplied to the IR data transmitter 40 in just a key-off state. [If the normal power source is turned off, Then, if it is determined that the fuel door is open S30, the normal power source is turned on, being connected to the sensing apparatus 20 S40, and if the fuel door is closed, the connection to the normal power source 10 is cut. That is, if the fuel door is opened, a sensing apparatus 20 supplies data to the power supply apparatus 30. The power supply apparatus 30 accepts the data, and supplies power to the IR data transmitter 40, temperature sensors, and pressure sensors of the hydrogen storage system.

If the hydrogen charging is finished and the fuel door is closed, the power supply to the IR data transmitter 40 and the various sensors is stopped/cutoff.

Furthermore, the present invention may be embodied as non-transitory computer readable media on a computer readable medium containing executable program instructions executed by a processor. Examples of the computer readable mediums include, but are not limited to, ROM, RAM, compact disc (CD)-ROMs, magnetic tapes, floppy disks, and optical data storage devices. The computer readable recording medium can also be distributed in network coupled computer systems so that the computer readable media is stored and executed in a distributed fashion.

By the above apparatus, because there is power supplied only to the sensing apparatus 20 when it is necessary, dark current is minimized, and failed start situations.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power supply apparatus for a fuel cell vehicle, comprising:
   an InfraRed (IR) data transmitter transmitting/receiving data to/from a hydrogen charger;
   a power supply apparatus that is connected to the IR data transmitter and selectively supplies power thereto according to the opening/closing of a fuel door;
   a sensing apparatus that is connected to the power supply apparatus and senses opening/closing the fuel door; and
   a normal power source that is connected to the sensing apparatus and that selectively supplies power to the sensing apparatus,
   wherein the normal power source supplies power to the IR data transmitter only in response to the sensing apparatus sensing that the fuel door is opened, and
   wherein the normal power source stops supplying power to the IR data transmitter when hydrogen charging of the fuel cell vehicle is finished and the fuel door is closed.

2. A method, comprising:
   keying off a fuel cell vehicle to begin hydrogen charging;
   in response to keying off the fuel cell vehicle, turning off, by a controller, a power source that is used to power an Infrared transmitter configured to communicate with a hydrogen charger until a fuel door is opened;
   in response to determining, by the controller, that the fuel door is opened, turning on the power source for an Infrared (IR) data transmitter only once the fuel door is opened; and
   upon determining, by the controller, that hydrogen charging has finished, turning off power to the power source.

3. A non-transitory computer readable medium containing executable program instructions executed by a processor, comprising:
   program instructions that turn off a power source that is used to power an Infrared transmitter configured to communicate with a hydrogen charger until a fuel door is opened/closed in response to keying off the fuel cell vehicle; and program instructions that turn on the power source to an Infrared (IR) data transmitter only once the fuel door is opened in response to determining that the fuel door has been opened; and program instructions that turn off power to the power source to the IR data transmitter upon determining that hydrogen charging has finished.

\* \* \* \* \*